May 17, 1955  J. I. GRIEVE  2,708,684
PRIMARY CELL
Filed Dec. 3, 1953  2 Sheets-Sheet 1
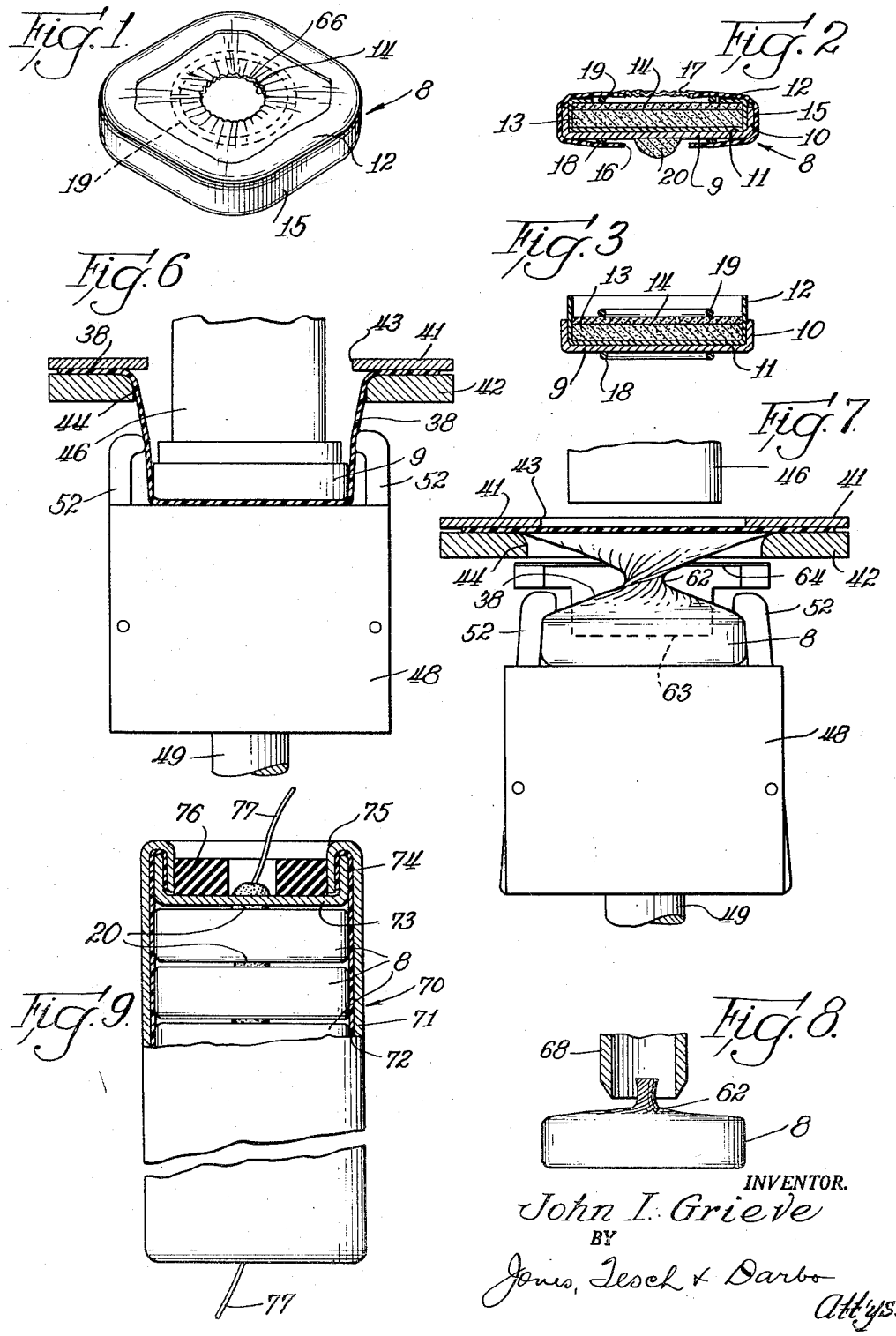
INVENTOR.
John I. Grieve
BY
Jones, Tesch & Darbo
Attys.

May 17, 1955  J. I. GRIEVE  2,708,684
PRIMARY CELL
Filed Dec. 3, 1953  2 Sheets-Sheet 2
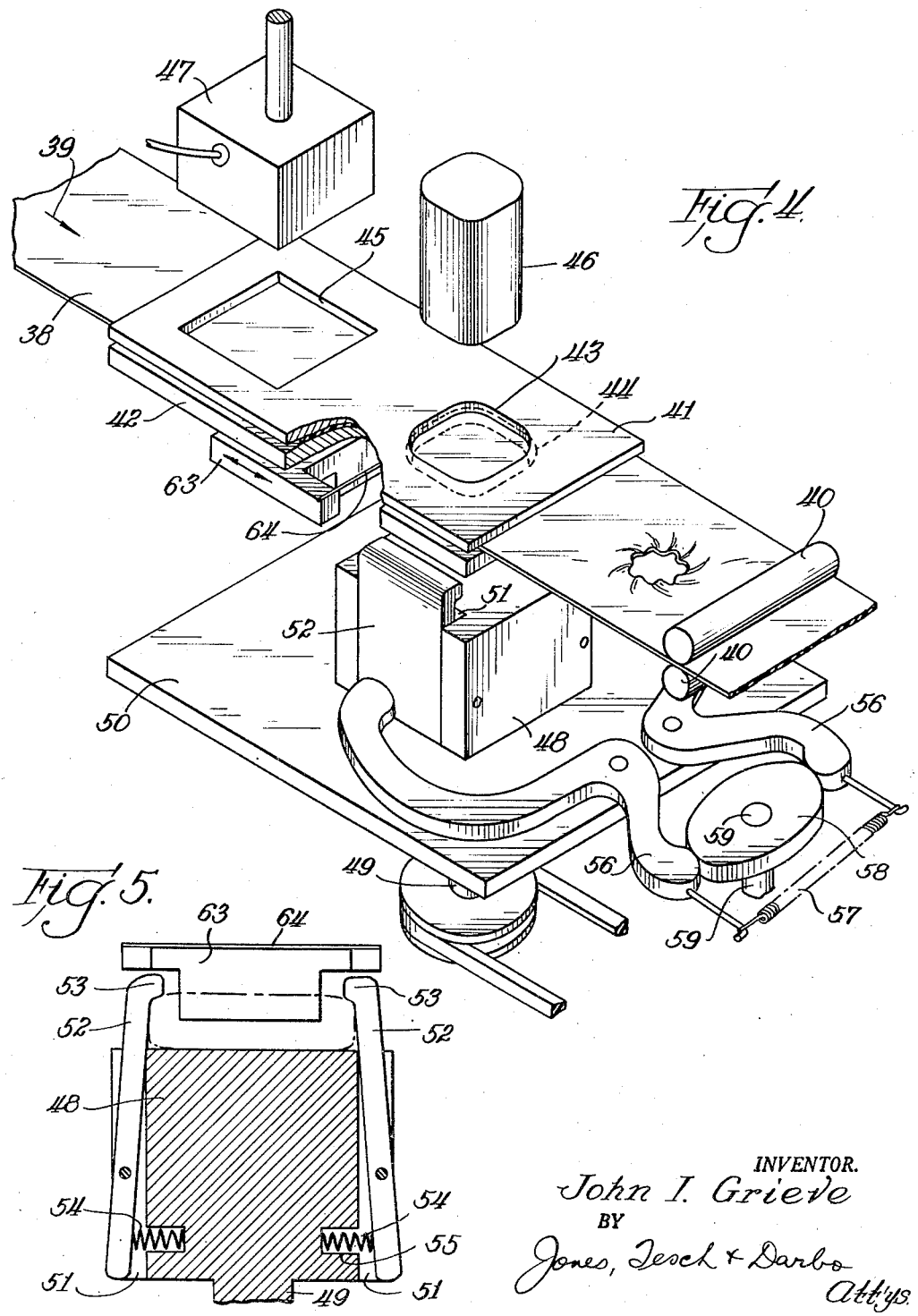
INVENTOR.
John I. Grieve
BY
Jones, Jesch & Darbo
Att'ys.

United States Patent Office 2,708,684
Patented May 17, 1955

2,708,684
PRIMARY CELL

John I. Grieve, Niagara Falls, Ontario, Canada, assignor to Burgess Battery Company, Freeport, Ill., a corporation of Delaware Application December 3, 1953, Serial No. 395,960

10 Claims. (Cl. 136—111)

This invention relates to improvements in primary cells of the flat type in which the cell elements are thin and flat and are arranged in a juxtaposed, laminar relation. More specifically, the invention relates to an improved construction for flat cells, which are adapted for use in multiple cell batteries in which the cells are connected in series and positioned in a stacked relationship, and the method of making the same. The invention is especially useful with batteries of small size such as those adapted for use in portable electronic equipment.

In small batteries of the character described there exists a plurality of problems brought about primarily by the small size and close relationship of the component elements of the cells. Since the depolarizing mix and the negative electrode of the same cell are in closely packed relationship and the electrolyte-receptive elements of adjacent cells are also in close relationship, provision of an effective means for preventing contact between the depolarizer and negative electrode of the same cell and for isolating the electrolyte of the individual cells is important. Leakage of the electrolyte between cells results in inter-cell short circuits and contact between the depolarizer and the negative electrode results in intra-cell short circuits. Such short circuits are usually accompanied by local action at the negative electrodes and the overall result is loss of energy and capacity and generally unsatisfactory performance and failure. Failure to isolate the electrolyte within the cells also shortens the shelf life of the batteries by permitting drying out of cells during storage.

Another problem is to provide a cell which meets the problems set forth and still is simple and economical from the standpoint of structure and method of manufacture and which lends itself to rapid machine production.

It is the primary object of this invention, therefore, to provide an improved cell structure of the character described and the method of manufacture thereof in which the problems mentioned heretofore are satisfactorily met whereby inter-cell and intra-cell short circuits are eliminated, the electrolyte of the individual cells is effectively isolated, and local action at the negative electrodes is avoided.

Another object of the invention is to provide an improved cell construction which is simple and economical from the various standpoints of structure, materials, and method of fabrication of the cells and the batteries.

Another object is to provide a completely sealed flat cell which can be stored for a substantial period of time and then tested for defects, before being incorporated in a multiple-cell battery, and a method for making such a cell.

Other objects and advantages will become apparent from the following description which is to be taken in conjunction with the accompanying drawings, in which Fig. 1 is a perspective view of an embodiment of the cell of the invention;

Fig. 2 is a sectional view, taken from the side, of the cell of Fig. 1;

Fig. 3 is a sectional view similar to Fig. 2 of the cell at an intermediate stage in its manufacture;

Fig. 4 is a perspective view of an apparatus for forming the sealing wrapper of the cell;

Fig. 5 is a sectional view of the cell-spinning part of the apparatus of Fig. 4;

Figs. 6 and 7 are fragmental views of the cell and apparatus in different stages of formation of the wrapper;

Fig. 8 is a side view of the cell at a further stage in the formation of the wrapper, and Fig. 9 is a fragmental sectional view, taken from the side, of a multiple-cell battery containing the cell of Figs. 1 and 2.

Referring to Figs. 1, 2 and 3, the cell is designated generally by the numeral 8. The negative electrode 9 is a thin, shallow cup- or tray-shaped element composed of a suitable metal such as zinc. It is substantially square in shape, having rounded corners, and the cell is likewise square in shape. The shape factor is not important in the present invention and any suitable shape may be used, such as oval, round, rectangular, etc. The rim 10 of the tray-shaped negative electrode is continuous throughout the perimeter of said electrode and projects a substantial distance away from the base or bottom.

Within and lining the interior surface of the negative electrode 9 is a thin, flexible, non-conductive, bibulous tray-shaped separator 11. The rim of separator 11 has an extension 12 which projects a substantial distance above the upper edge of the rim 10 of the negative electrode for a purpose which will be described hereinafter. Separator 11 is the electrolyte-receptive element of the cell and may be composed of suitable absorbent paper.

Positioned within separator 11 and in contact with the bottom and rim surfaces thereof is the depolarizing element or mix cake 13. Said mix is of conventional composition such as a mixture of powdered manganese dioxide and carbon, and is moistened with the electrolyte of the cell which is of conventional composition such as a dilute aqueous solution of ammonium chloride and zinc chloride. Said mix cake is caused to be of such size and shape as to snugly fit within the separator 11, leaving exposed only its broad top surface. The rim 12 of the separator extends above the top surface of the mix cake 13. The separator 11 absorbs electrolyte from the mix 13 to render the cell operative.

Parallel and adjacent to the broad top surface of mix cake 13 is the positive electrode 14, which is a thin, flat, flexible conductive sheet or plate having substantially the same lateral size and shape as the mix cake 13. It is composed in the known manner of conducting carbon or graphite particles and a binder such as polyisobutylene. Other known forms, such as a flexible fabric impregnated with a carbonaceous composition, may be used with equal effectiveness.

In accordance with the present invention, each cell is provided with a one-piece, seamless, drawn enclosure or wrapper 15, composed of thin, tough, impervious, electrolyte-resistant, non-conductive thermoplastic sheet material which upon the application of heat, that is, at an elevated temperature, has the property of plasticity and stretchability and also of adhering to itself and other surfaces. Said wrapper may be composed of polyethylene, the copolymer of vinyl chloride and vinyl acetate, the rubber hydrochloride product sold commercially as "Pliofilm," or the like. The rubber hydrochloride product is preferred.

Wrapper 15 has a pair of substantially centrally located apertures 16 and 17 in the bottom and top portions thereof respectively, said apertures exposing areas of the negative and positive electrodes 9 and 14 for electrical connection with adjacent cells.

Encircling aperture 16 and positioned between wrapper 15 and the negative electrode 9 is a ring 18 of electrolyte-resistant, non-conductive, adhesive-plastic material. Ring 18 is composed of tar, pitch, asphalt or the like and adhesively joins wrapper 15 to the broad exterior surface of the negative electrode 9 to provide a sealing joint between the two elements. At the opposite broad surface of the cell is located ring 19, similar in composition to ring 18, and which encircles aperture 17 and is positioned between wrapper 15 and positive electrode 14 and adhesively joins them together in sealing relationship.

Due to the plastic nature of rings 18 and 19, liquid-tight seals are formed around apertures 16 and 17 respectively. Thus the interior of the cell and particularly the electrolyte-receptive elements thereof are isolated and sealed from the surrounding space. At the same time, portions of the electrodes 9 and 14 are exposed by apertures 16 and 17 for connection to adjacent cells. An adhesive plastic conductive mass 20 is applied to the surface of negative electrode 9 which is exposed at the aperture 16, said mass serving as the means for connecting the cell to the adjacent cell in the multiple-cell battery. The conductive mass is of any suitable composition, such as finely divided particles of silver supported in a wax-like binder-lubricant as is disclosed in the copending application of Sam Kurlandsky, Serial No. 161,892, filed May 13, 1950, now Patent No. 2,666,803. The mass 20 may be applied to the positive electrode 14 instead of the negative electrode 9.

The construction and the method of application of the wrapper 15 are features of the present invention. The cell prior to the application of the wrapper 15 and the conductive mass 20 is shown in Fig. 3. An apparatus for applying the wrapper is shown in Figs. 4 and 5. A continuous strip or ribbon 38 of the thermoplastic material for the wrapper is fed intermittently in the direction of the arrow 39 by the feed rolls 40 freely between spaced-apart upper and lower plates 41 and 42. Said plates are preferably composed of a material which does not make adhesive union with the heated thermoplastic ribbon 38, such as hard rubber, aluminum, zinc or magnesium, or they may be composed of a material which does make such adhesive union in which case areas thereof which come in contact with the heated ribbon are coated or covered with a material which does not make such union such as the polymerized tetrafluoroethylene product known by the trade-mark "Teflon."

The lower plate 42 is stationary and the upper plate 41 is movable downward into contact with the lower plate in synchronism with the pauses in the intermittent feed of the ribbon 38. The forward portions of plates 41 and 42, in the direction of travel of ribbon 38, are provided with apertures 43 and 44 respectively. Said apertures are in vertical registry with each other and aperture 43 has substantially the same shape as the lateral shape of the cells to be sealed and is slightly larger than the cells, and aperture 44 is of rectangular shape and somewhat larger than aperture 43. The edge of plate 42 surrounding aperture 44 is made smooth and is rounded where it intersects the top surface of the plate for a reason which will be explained hereinafter. At the rearward portion thereof, the upper plate 41 is provided with a second aperture 45 which is substantially larger than apertures 43 and 44. The apparatus contains means (not shown) for causing the various operating parts thereof to perform their intended operations upon the ribbon 38 and the cell during pauses in the intermittent forward movement of said ribbon. During the first pause, the upper plate 41 is moved downwardly into pressure contact with lower plate 42 to hold the ribbon 38 firmly in position. At substantially the same time, a vertically-movable flat-bottomed heating element or platen 47 is moved downwardly through opening 45 in upper plate 41 into contact with the firmly held section of ribbon 38 which is exposed at opening 45, whereby said section is heated to an elevated temperature such that it is plastic and stretchable.

The ribbon 38 has a width substantially greater than the corresponding dimension of a cell and aperture 45 and the heating surface of platen 47 are substantially larger than the bottom of the cell, whereby a relatively large area of the ribbon is heated. After the ribbon section has been heated, the plate 41 and platen 47 are raised simultaneously and the ribbon is advanced to a position such that substantially the central portion of the heated section of said ribbon is in register with the apertures 43 and 44. The second pause in the intermittent advance of the ribbon then occurs. The plate 41 is then lowered again into contact with plate 42 so as to hold and immobilize the portions of the ribbon that are between the plates. An unwrapped cell, such as is shown in Fig. 3, is placed in aperture 43 where it is held against lateral movement by the aperture and is supported by ribbon 38. A vertically movable depressing tool or punch 46 is then brought downwardly against the upper surface of the cell, that is, against the positive electrode 14 with the ring 19 thereon. Said punch is small enough that it does not engage the rim 12 of separator 11. Said downward movement is continued, pushing the cell and heated section of ribbon 38 downwardly through apertures 43 and 44 until the bottom of the cell comes in contact with the top surface of a spinner block 48, the heated section of the ribbon 38 undergoing stretching during this operation, as is illustrated in Fig. 6. At this stage in the operation, the ribbon 38 covers the bottom of the cell 8 and bends upwardly along the exterior lateral surfaces of the rim of electrode 9 and extends in the stretched condition upwardly through aperture 44 to the upper surface of the lower plate 42, where it is held securely by pressure between plates 41 and 42. The fact that aperture 44 is larger than aperture 43 and that the edges of aperture 44 are smooth and rounded as described permits the ribbon 38 to be stretched without being cut during this last operation.

Spinner block 48 is spaced below lower plate 42 and is in alignment with apertures 43 and 44. It is suitably mounted for rotation upon the vertical shaft 49 which is supported by frame member 50. Block 48 is a cube-shaped member having a flat horizontal top surface of substantially greater area than the base of a cell. Two opposite vertical sides of block 48 have vertical slots or recesses 51 therein within which are pivotally mounted a pair of clamping jaws 52 the upper ends of which project above the top surface of block 48 and have inwardly projecting hooks or lugs 53. At the lower end portions thereof, jaws 52 are urged outwardly by the compression springs 54 whereby the upper or clamping ends of the jaws are spring-urged inwardly or toward each other. Springs 54 are mounted at the inner ends thereof in recesses 55 within block 48.

Associated with jaws 52 is the toggle or tong arrangement consisting of the pair of tongs 56 which are pivotally mounted at an immediate section thereof upon supporting frame member 50. At the inner ends thereof the tongs 56 are in cooperative engagement with the exterior surfaces of the lower end portions of the jaws 52, and at the outer ends thereof they are urged toward each other by the tension spring 57, whereby the tongs are spring-urged in such manner as to release jaws 52 and permit a clamping action by the upper ends thereof, under the influence of springs 54. Between the outer ends of tongs 56 is arranged the generally oval-shaped cam 58 which is mounted for rotation upon the vertical shaft 59, the arrangement being such that when the cam is rotated to the position in which the long dimension thereof extends between the outer ends of the tongs, as shown in Fig. 4, the inner ends are moved inwardly and the clamping ends of the jaws 52 are moved apart, and when the short dimension of the cam extends between the tongs, the spring 57 urges the inward ends of the tongs apart and springs 54 move the jaws together into clamping position.

The arrangement is such that at the moment that the cell 8 is pushed down against the top surface of spinner block 48, cam 58 is in the position shown in Fig. 4 in which the clamping ends of jaws 52 are moved apart by tongs 56, and the cell rests between said jaws. The cam 58 is then rotated substantially 90 degrees to the position in which the tongs release their pressure against the jaws 52 and the latter are permitted to make clamping engagement with the cell as is illustrated in Figs. 5 and 7. In this position of the tong arrangement, the inner ends of the tongs are spread apart a sufficient distance that rotation of spinner block 48 on shaft 49 can take place freely. The shaft 49 is then rotated a substantial number of revolutions, and with it the spinner block and the cell are rotated. The upwardly extending portions of the stretched section of the ribbon 38 are held fixed between plates 41 and 42 during this spinning operation, and as a result such extending portion is twisted in the manner illustrated in Fig. 7, and a nub 62 of twisted wrapper material is formed substantially centrally of the top of the cell. After this nub has been formed, the rotation of block 48 is stopped, and a cutting and knock-out member 63 is operated to sever the wrapper material at the nub 62 and push the cell off of the top of block 48. The latter member is in the form of a horizontal U, arranged to the left of a cell on block 48, as viewed in Fig. 4, with the legs of the U directed toward the cell and with a wire 64 supported by and stretched between the ends of the legs of the U, said wire being heated by suitable means (not shown).

Upon the stopping of the spinning of block 48, the member 63 is moved horizontally to the right, across the top of block 48, (as viewed in Fig. 4) and the wire 64 severs the wrapper material at or adjacent to the nub 62, leaving the cell 8 with the nub attached as shown in Fig. 8. Thereupon, cam 58 is rotated to the position shown in Fig. 4 in which tongs 56 press the lower ends of jaws together and the cell is released by said jaws. Immediately following such release, the movement of the member 63 to the right is continued and the base of the U makes contact with the cell and pushes it laterally off of the top of block 48 from whence it falls into a suitable receptacle (not shown) provided for the purpose. Thereupon the member 63 is moved backward to its original position, as shown in Fig. 4.

The heating by platen 47 is controlled so that during the stretching and twisting operations the ribbon is at a suitable elevated temperature at which it is plastic and stretchable, and said operations are accomplished easily without tearing the ribbon. With the "Pliofilm" material the ribbon is heated to a temperature of 210° F. to 250° F. and in addition to being plastic and stretchable, it is elastic. As a result of the stretching and twisting operations, the wrapper of ribbon material is drawn under tension into tight pressure contact with the bottom and side surfaces of the cell and also into tight engagement with the top surface of the cell and the adhesive, plastic ring 19. Also, the plastic material is twisted into pressure contact with itself and welds together at the nub 62 and the folds radiating out from said nub. The wrapper is thereby fixed in the closed condition and the twisting force can be removed as by severing the wrapper material at or above the nub 62 as has been described. Also, during the twisting operation, the upwardly projecting portions 12 of the bibulous separator 11 are folded and pressed inwardly against the upper surface of the positive electrode 14. The legs of member 63 and the wire 64 are at an elevated position, as shown in Fig. 4, whereby these parts do not encounter jaws 52 or the cell on block 48 in their movement across the top of said block.

After the cell has been wrapped as described, upper plate 41 is moved upwardly out of contact with lower plate 42, and ribbon 38 is advanced by feed rolls 40 to a position such that a new section of the ribbon is in register with opening 45. In practice, heating element 47 and depressing tool or punch 46 are moved downwardly simultaneously whereby platen 47 heats one section while punch 46 depresses a cell and causes stretching of the next adjacent section which has been heated by platen 47 in the preceding operation. In this way, intermittent operation of the apparatus is continued and the cells are wrapped in consecutive order.

The central portions of the sections of the wrapper 15 covering the opposite broad surfaces of the cell are severed and removed to form the apertures 16 and 17. This may be accomplished in any suitable manner, and in practice is done by bringing into pressure contact with the wrapper a heated tube 68 having the end sharpened to an edge, as is indicated in Fig. 8. Under the influence of the heat, the material of the wrapper is readily cut and the central portions are removed to form the apertures. At the same time that aperture 17 is formed in the manner described, the twisted nub 62 of wrapper material is removed. The operation of severing nub 62 is so timed that by then the wrapper material has then cooled to the non-plastic non-elastic condition whereby it remains fixed in its tight cell-enclosing condition.

The twisting of the wrapper material with the formation of the nub 62, as has been described heretofore, results in the formation of folds 66 in that portion of wrapper material adjacent to the nub 62, and after said nub has been severed and removed, the folds remain, as is shown in Fig. 1. In the next operation, a plastic conductive mass 20 is applied to the surface of one of the electrodes 9 and 14 which is exposed at apertures 16 and 17. As shown in Fig. 2, the mass is applied to the exposed surface of negative electrode 9.

The cell which has been described is especially suitable for use in small multiple-cell batteries adapted for powering portable electronic equipment, such as hearing aids, radios, etc. To form a battery of such cells, the desired number of cells 8, completed as shown in Fig. 2, are stacked in an open-ended non-conductive tube or casing 70 of a suitable composition, preferably having an exterior layer 71 of a tough, strong, sheet material such as resin-impregnated kraft paper and an interior layer or lining 72 of a thermoplastically adhesive, electrolyte-resistant material, which may be of a composition similar to that of a wrapper for the cells, rubber hydrochloride being preferred.

The open ends of the casing 70 extend beyond the stack, and at each end a conductive metal tray 73 is fitted within the open end of the casing with the rim 74 of the tray projecting outwardly and away from the stack. The tray is composed of any suitable conductive metal such as copper, zinc, brass or the like. The under side of the tray is electrically connected by conductive mass 20 to the terminal of the end cell which is exposed at the opening 17 in the wrapper 15 of said cell. The tray 73 is of substantially the same lateral size and shape as the stack, so as to insure a snug fit within the casing. The open end of the casing extends a substantial distance beyond the tray.

The stack is placed under longitudinal compression, and the extending portion 75 of the casing is folded inwardly over the edge of the tray-rim 74 and downwardly against the interior surface of said rim, the extending portion 75 terminating substantially at the bottom of the tray 73. A rigid non-conductive washer 76, composed of any suitable non-conductive material such as synthetic resin, fiber board or the like is then inserted into tray 73. Said washer is of the same lateral shape as the tray 73 and is of such a size as to make a press-fit with the portion 75 of the casing which lines the rim of the tray. The washer 76 is forced downwardly into the tray under substantial pressure. The pressure engagement of washer 76 with the surfaces of the portion 75 of casing 70 is such that a permanent, tight, frictional press-fit joint is formed. The battery terminal conductor 77 is connected, as by solder, to the portion of the bottom of tray 73 which is exposed at the central portion of washer 76. The closure and terminal arrangement described is constructed at both ends of the casing. In practice, one end closure such as has been described, is first formed at one end of the casing 70, the stack of cells is then inserted from the other end, the stack is placed under compression, and the closure is then formed at the latter end of the casing.

Heat and pressure are then applied to the lateral walls of the casing 70, as by a pair of suitably shaped heated platens (not shown) and the thermoplastic lining 72 is thereby caused to form a strong adhesive joint with the lateral surfaces of the cells by thermoplastic union of said lining 72 with the wrappers 15 of the cells. Said adhesive joints are also of a sealing character, whereby a strong, rigid unitary battery is formed in which the seal just described forms a second seal which supplements the seal formed by the wrappers 15 themselves and which serves to isolate the electrolyte of the individual cells and thereby prevent short circuits.

From the above, it is clear that small cells made in accordance with the present invention are simple and economical and rapidly made, and at the same time are of a construction such that particles of mix are prevented from making contact with the negative electrode, and a complete and effective sealing enclosure is obtained whereby the electrolyte is confined and cannot escape from the cell.

Such a completely enclosed cell has the advantage that it can be made at any time, regardless of when it is desired to make the multiple cell batteries, and it can be stored until it is desired to assemble the batteries. At such time, the cells can be tested individually for voltage and current, whereby defects can be discovered before they are incorporated in a battery. With small flat cells, it is usually not possible to store the cells a sufficient length of time for defects to show up in the form of low voltage or current before having to incorporate them in batteries, because they are not sealed sufficiently to prevent drying out. In this way, it is frequently necessary to discard an entire battery because of the presence of one defective cell. This disadvantage is overcome in the cell and battery of the present invention. If desired, with the cell of the present invention, the formation of the apertures 16 and 17 can be delayed until just before the cell is to be incorporated in a battery.

Also, a multiple-cell battery is formed which is simple and economical from both the structure and manufacturing standpoint, and lends itself to rapid machine production.

Invention is claimed as follows:

1. In a flat primary cell, a tray-form negative electrode, a bibulous, non-conductive sheet-form separator lining the interior of said tray-form electrode and having a rim projecting upwardly a substantial distance beyond the rim of said electrode, a depolarizer body within said lined tray, a sheet-form positive electrode in juxtaposed relation and electrical contact with the upper surface of said depolarizer body, the bottom of said negative electrode and the upper surface of said positive electrode forming the faces of said cell, the rim of said separator being folded inwardly over the marginal portions of the upper surface of said positive electrode, whereby said mix-cake is completely enclosed by said separator and positive electrode, an impervious, one-piece sealing wrapper, comprising a flexible, non-conductive, electrolyte-resistant, thermoplastic sheet initially stretched under heat and tension around the bottom and lateral exterior surfaces of the cell and drawn into intimate contact with the top exterior surface of the cell by twisting the upper extremities of the sheet a substantial number of times, said sealing wrapper having an aperture substantially central of each of the opposite faces of said cell, and a ring of electrolyte-resistant, plastic material encircling each said aperture and positioned between said wrapper and the electrode adjacent thereto and adhesively joining said wrapper and electrode, whereby said cell is completely sealed from the surrounding space except for the exposed surface portions of said electrodes.

2. In a flat primary cell, a tray-form negative electrode, a bibulous, non-conductive sheet-form separator lining the interior of said tray-form electrode and having a rim projecting upwardly a substantial distance beyond the rim of said electrode, a depolarizer body within said lined tray, a sheet-form positive electrode in juxtaposed relation and electrical contact with the upper surface of said depolarizer body, the rim of said separator being folded inwardly over the upper surface of said positive electrode, whereby said depolarizer body is completely enclosed by said separator and positive electrode, an impervious, one-piece sealing wrapper comprising a flexible, non-conductive, electrolyte-resistant, thermoplastic sheet initially stretched under heat and tension around the exterior of the cell and drawn by twisting into contact with the surface of said cell, said sealing wrapper having an aperture in each of the portions thereof adjacent to the upper and lower surfaces of said cell, and a ring of electrolyte-resistant, plastic material encircling each said aperture and positioned between said wrapper and the electrode adjacent thereto and adhesively joining said wrapper and electrode, whereby said cell is completely sealed from the surrounding space except for the exposed surface portions of said electrodes.

3. In a flat primary cell, a tray-form negative electrode, a bibulous, non-conductive sheet-form separator lining the interior of said tray-form electrode and having a rim projecting upwardly a substantial distance beyond the rim of said electrode, a depolarizer body within said lined tray, a sheet-form positive electrode in juxtaposed relation and electrical contact with the upper surface of said depolarizer body, the rim of said separator being folded inwardly over the marginal portions of the upper surface of said positive electrode, whereby said depolarizer body is completely enclosed by said separator and positive electrode, an impervious, one-piece sealing wrapper, comprising a flexible, non-conductive, electrolyte-resistant, thermoplastic sheet drawn under heat and tension around the exterior surfaces of the cell, a nub of twisted wrapper material in the portion of said wrapper adjacent to one of said electrodes, a ring of electrolyte-resistant, plastic material between each of said cell electrodes and the portion of the wrapper adjacent thereto and adhesively joining said wrapper and electrode, whereby said cell is completely sealed from the surrounding space.

4. In a wafer-shaped primary cell having a positive electrode, a negative electrode, and electrolyte-receptive elements including a depolarizer body between said electrodes, said cell having a pair of opposite broad surfaces, an impervious, one-piece sealing wrapper, comprising a flexible non-conductive, electrolyte-resistant, thermoplastic sheet stretched under heat and tension around the exterior of the cell and drawn by twisting into contact with a broad surface of said cell, said sealing wrapper having an aperture in each of the portions thereof adjacent to a broad surface of said cell, and a ring of electrolyte-resistant, adhesive material encircling each said aperture and positioned between said wrapper and the broad cell surface adjacent thereto and adhesively joining said wrapper and said cell surfaces, whereby the interior of said cell is sealed from the surrounding space.

5. In a primary cell having a tray-form negative electrode, a bibulous separator lining the interior of said negative electrode, a depolarizer body within said lined negative electrode, and a sheet-form positive electrode in contact with said depolarizing body, a sealing wrapper comprising an impervious, non-conductive electrolyte-resistant, thermoplastic sheet stretched under heat and tension about the bottom and lateral surfaces of the cell and twisted tightly in its upper extremities into intimate contact relation with the upper surface of the cell.

6. In a primary cell having a positive electrode, a negative electrode and electrolyte-retaining elements including a depolarizer body between said electrodes, said cell having two opposite broad surfaces, an impervious sealing wrapper, comprising a sheet of non-conductive electrolyte-resistant, thermoplastic material stretched under heat and tension against all surfaces of said cell except one broad surface thereof and twisted into intimate contact with said broad surface.

7. In a primary cell having a positive electrode, a negative electrode and electrolyte-retaining elements including a depolarizer body between said electrodes, a sealing wrapper comprising an impervious, non-conductive, electrolyte-resistant thermoplastic sheet stretched under heat and tension about the exterior of said cell and drawn by twisting into contact with the surface of said cell.

8. The method of making a flat, primary cell comprising the following steps: lining the interior of a tray-form negative electrode with a bibulous non-conductive separator element and causing the rim of the resulting tray-shaped separator to project a substantial distance beyond the rim of said tray-form electrode, inserting a depolarizer body within the lined tray, positioning a sheet-form positive electrode on the exposed surface of said depolarizer body, depositing an electrolyte-impervious, adhesive, plastic, ring-shaped element on the broad exterior surface of each of the aforesaid electrodes, heating a thin sheet of impervious, electrolyte-resistant, thermoplastic material having an area greater than the base area of a cell, holding said sheet firmly about its periphery and while said sheet is so held bringing the bottom surface of the negative electrode into contact with said heated sheet, forcing said cell downwardly whereby the heated sheet is stretched and drawn into tight contact with the bottom and lateral surfaces of said cell, and rotating the cell a substantial number of revolutions about an axis normal to said bottom surface, thereby twisting the heated material sufficiently to bring the same into intimate contact with the upper surface of said positive electrode, said twisting action causing said projecting rim of said separator to be folded inwardly into contiguous relation to the upper surface of the positive electrode and said plastic rings to be adhesively joined to said wrapper and the upper surface of said positive electrode and lower surface of said negative electrode, thereafter severing the twisted portion of the wrapper leaving a nub of twisted material on top of said cell; and cutting a pair of apertures in portions of said wrapper within the areas of said wrapper encircled by said plastic rings respectively, one of said portions containing said nub of twisted material whereby said nub is removed when said aperture is formed.

9. The method of making a seal-wrapped, wafer-shaped primary cell comprising the following steps: heating a sheet of impervious, electrolyte-resistant thermoplastic material and while holding said heated sheet about its periphery, positioning a cell with a broad surface thereof against said heated sheet and forcing said cell transversely of said sheet whereby said sheet is stretched and drawn tightly against said broad surface and the lateral surfaces of said cell; with the edges of the distended sheet firmly held, rotating said partially enclosed cell about an axis normal to said broad surface thereof thereby twisting said sheet and drawing the same contiguous to the broad surface of said cell opposite to said first mentioned broad surface thereof, severing said sheet at the twisted portion thereof leaving a nub of twisted material adjacent said last mentioned broad surface of said cell, and cutting a pair of apertures in said wrapper at opposite broad surfaces of said cell respectively, one surface being that containing said nub, said last mentioned cutting operation causing the removal of said nub.

10. The method of making a seal-wrapped primary cell which comprises heating a sheet of impervious, electrolyte-resistant thermoplastic material, stretching said heated sheet about the exterior of said cell, and twisting said sheet to draw it into contact with the surface of said cell.

References Cited in the file of this patent

UNITED STATES PATENTS

| Number | Name | Date |
|---|---|---|
| 2,307,764 | Deibel et al. | Jan. 12, 1943 |
| 2,400,099 | Brubaker | May 14, 1946 |
| 2,463,089 | Deibel | Mar. 1, 1949 |